United States Patent [19]
Reitsma

[11] 3,748,382

[45] July 24, 1973

[54] VIDEO CONTOUR DETERMINING CIRCUIT

[75] Inventor: Hantje Reitsma, Emmasingel, Eindhoven, Netherlands

[73] Assignee: U.S. Philips Corporation, New York, N.Y.

[22] Filed: July 29, 1971

[21] Appl. No.: 167,238

[52] U.S. Cl....... 178/7.1, 178/DIG. 26, 178/DIG. 34

[51] Int. Cl. ............................................ H04n 5/14

[58] Field of Search......................... 179/6, 6.8, 7.1, 179/7.2, DIG. 26, DIG. 34

[56] References Cited

UNITED STATES PATENTS

| | | | |
|---|---|---|---|
| 3,361,872 | 1/1968 | Sweeney | 178/DIG. 34 |
| 3,581,109 | 5/1971 | Olsson et al. | 178/DIG. 34 |
| 3,591,713 | 7/1971 | Olsson et al. | 178/DIG. 34 |
| 3,543,169 | 11/1970 | Hill | 178/DIG. 26 |
| 3,670,100 | 6/1972 | Briggs et al. | 178/DIG. 26 |
| 3,700,794 | 10/1972 | Loose | 178/DIG. 26 |

*Primary Examiner*—Robert L. Richardson
*Attorney*—Frank R. Trifari

[57] ABSTRACT

A circuit for extracting contour information from a video signal having an irregular background signal has a buffer storage circuit for supplying a signal that is dependent upon the video signal of a previous line scan. A read-out circuit supplies a D.C. signal dependant upon said buffer storage signal for setting the black level of the video signal so that the backg round level is subtracted out.

5 Claims, 10 Drawing Figures

INVENTOR.

HANTJE REITSMA

BY

AGENT

INVENTOR.

HANTJE REITSMA

BY

AGENT

VIDEO CONTOUR DETERMINING CIRCUIT

The invention relates to a video contour determining circuit for obtaining a contour information from a video signal, which circuit includes a level comparison circuit coupled to a video signal input thereof, which level comparison circuit is coupled to a level variation circuit by which the level in the video signal corresponding to the contour information to be obtained from the video signal is variable, the level comparison circuit having an input coupled to a video signal input of the video contour determining circuit.

A circuit of the kind described above is known from "Work in Progress" volume 94, 1970, pages 203–205 in which the contour information obtained serves for obtaining a measuring value which corresponds to the surface within the given contour in the video signal to be displayed on a display tube. In the level comparison circuit a manually adjustable level variation circuit is shown.

A drawback of such circuits is that as a result of the irregular structure of the picture of the object from which the video signal is obtained and in which, for example, unwanted picture parts occur a variation which is also dependent on these unwanted picture parts occurs in the level in the video signal to which the contour information corresponds.

An object of the present invention is to mitigate this drawback to a great extent.

According to the invention a video contour determining circuit of the kind described in the preamble is characterized in that a buffer storage circuit is coupled to the said input of the level comparison circuit, an output of which buffer storage circuit is coupled to a read-out storage circuit, said buffer storage circuit including a storage reset circuit, while an output of the read-out storage circuit is coupled to the level variation circuit, the read-out storage circuit and the reset circuit each being coupled to a pulse signal output of a pulse generating circuit at which pulses synchronized with synchronizing signals in the video signal successively occur during operation.

By using a buffer storage circuit in which a desired picture content information, for example, a maximum, minimum or mean value of the video signal over one line period is stored and which is a measure of the desired level variation, and by using a read-out storage circuit from which this picture content information can be derived during a subsequent line period while the buffer store is fed with new information after it is reset, a very rapid and accurate level information may be obtained which after application to the level comparison circuit provides a contour information adapted to the nature of the video signal.

Detection circuits may be used to obtain maximum or minimum values or combinations thereof from the video signal. The Applicant has found that the buffer store can be favorably fed for purposes of cardioplanimetry by integrating the video signal information over that part of a line period during which it is important.

It is to be noted that the use of a buffer storage circuit including a reset circuit and a read-out storage circuit is known for an X-ray videodensitometer described in an Article in "Elektromedizin," volume 12/1967, no. 3, page 93. This circuit combination is used in that case for measuring the influence of a contrast means used for taking X-ray pictures.

In order that the invention may be readily carried into effect, some embodiments thereof will now be described in detail by way of example, with reference to the accompanying diagrammatic drawings, in which.

Figure 1:
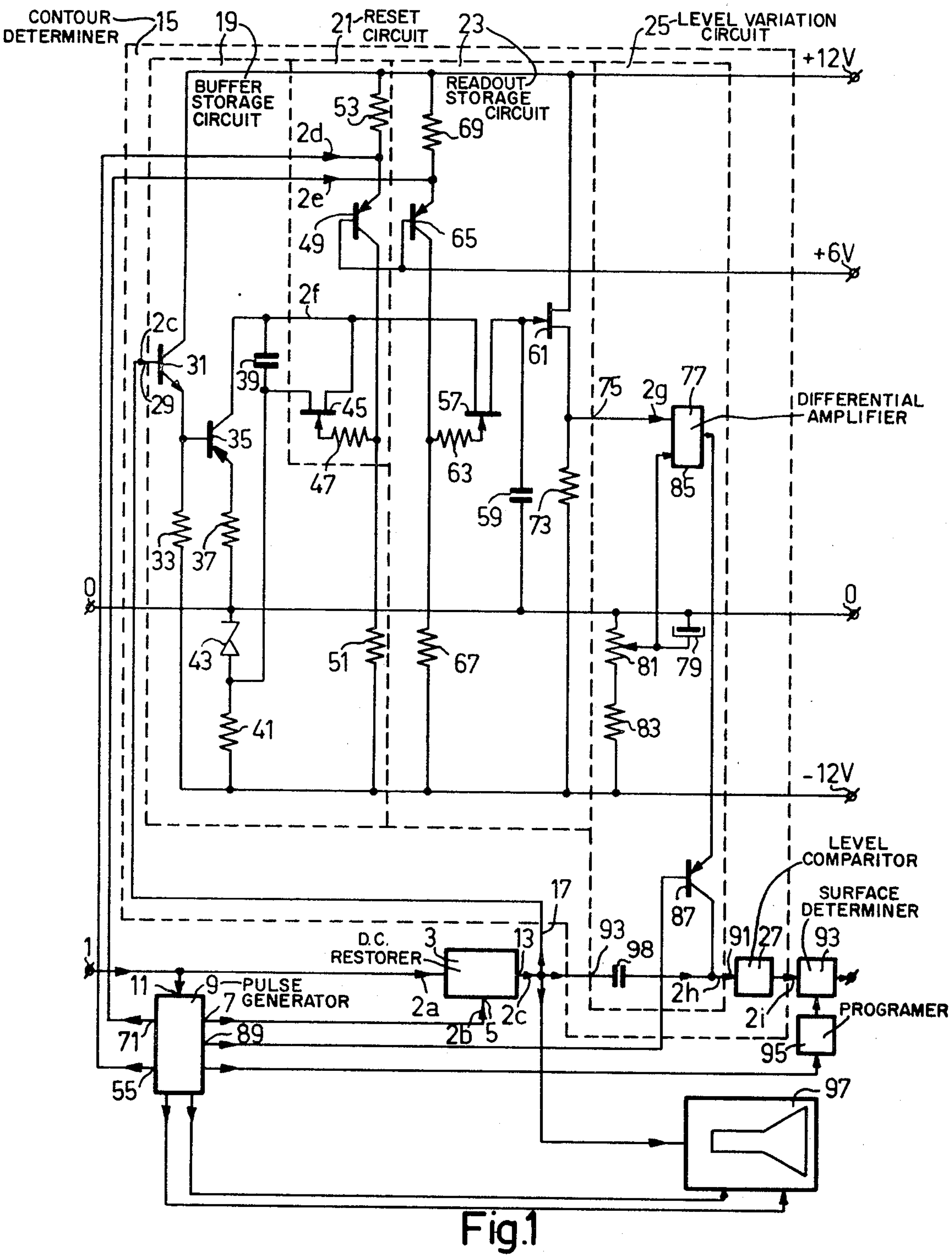
FIG. 1 shows a circuit diagram of a possible embodiment of a video contour determining circuit according to the invention included in a cardio-planimeter.

In FIG. 1 a video signal originating from an X-ray picture of a heart and provided by, for example, an X-ray television camera, an X-ray image sensor, a magnetophone or any other device with which similar information is produced, is applied to an input terminal 1 of a cardioplanimeter. This video signal is shown in FIG. **2*a*** for two different line periods.

The input 1 is connected to an input of a video signal handling circuit 3 a pulse signal input 5 of which is connected to an output 7 of a pulse generator 9 which is synchronized by a synchronizing signal in the video signal applied to the input 11 which is connected to the input 1.

The DC component of the video signal is maintained or restored in the video signal handling circuit 3.

The pulse applied to the input 5 of the video signal handling circuit 3 is a so-called window pulse shown in FIG. **2*b*** with which optionally an unimportant portion of the picture to be examined may be suppressed.

A video signal as shown in FIG. **2*c* then appears at an output 13.**

In FIGS. **2*a* and 2*c*** the horizontal broken lines diagrammatically show the location of the levels in the two video signals shown side by side in different parts of the picture and hence occurring during different line periods, at which level location a contour information is to be obtained so as to enable a correct interpretation thereof. These levels are dependent on the signal contents of the video signal.

The correct contour information is obtained in a contour determining circuit 15 according to the invention. The contour determining circuit 15 has a video signal input 17 which is connected to the output 13 of the video signal handling circut 3 and it comprises successively a buffer storage circuit 19 including a reset circuit 21, a read-out storage circuit 23, a level variation circuit 25 and a level comparison circuit 27.

An input 29 of the buffer storage circuit 19 receives the video signal applied to the input 17 of the contour determining circuit 15. This video signal is applied to the base of an npn-transistor 31 arranged as an emitter follower and is reproduced across an emitter resistor 33 connected to a negative voltage supply of −12 Volt. The collector of transistor 31 is connected to a positive voltage supply of +12 Volt.

The video signal across the emitter resistor 33 is also present at the base of a pnp-transistor 35 whose emitter is connected through a resistor 37 to a O terminal of a supply source and whose collector is connected through a capacitor 39 to a negative voltage of −6 Volt which is provided by a potential divider including a resistor 41 and a Zener diode 43. The capacitor 39 is shunted by a FET transistor 45 of the storage reset circuit 21.

Figures 2A, 2B, 2C, 2D, 2E, 2F, 2G, 2H, 2I:
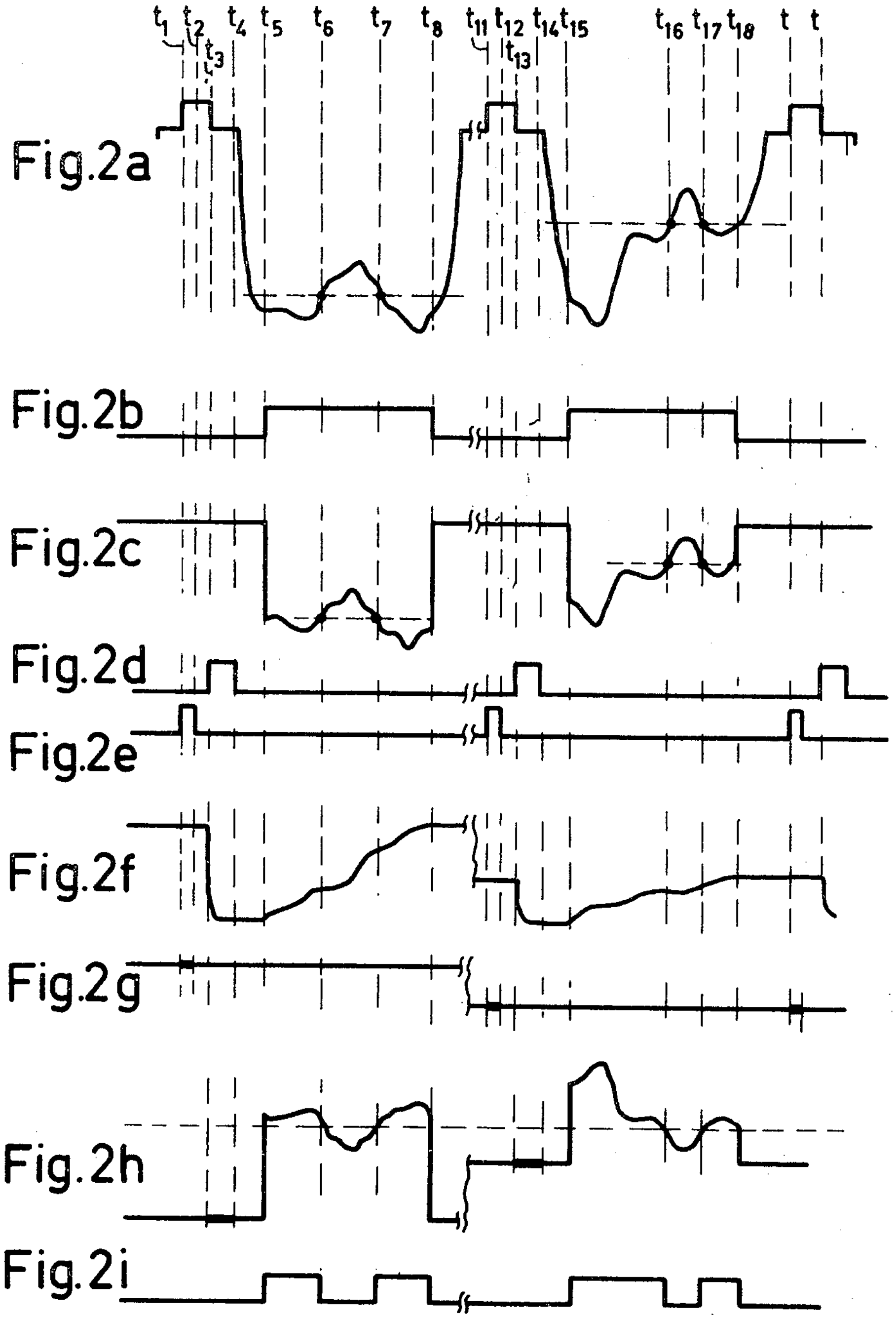
FIG. 2 shows waveforms as a function of time which occur during two different line periods at different points in the circuit of FIG. 1.

The transistor 35 serves as a video signal current source and charges the capacitor 39 during the occurrence of the video signal, which capacitor thereby receives a charge and thus a voltage which is dependent on the picture contents and in this case has an integrated value of the video signal current. The variation of the voltage across capacitor 39 is shown in FIG. 2*f*.

The control electrode of the FET transistor 45 in the reset circuit 21 is connected through a resistor 47 to the collector of a pnp-transistor 49. Furthermore, the collector is connected through a resistor 51 to the voltage supply of −12 Volt. The base of transistor 49 is connected to a voltage supply of +6 Volt and the emitter is connected through a resistor 53 to the +12 Volt voltage supply. Furthermore, a pulse originating from an output 55 of pulse generator 9 is applied to the emitter which pulse occurs every time after the occurrence of the synchronizing pulse in the video signal. This is shown in FIG. 2*d*.

The connection of the collector of transistor 35 to the buffer storage capacitor 39 is furthermore connected through a FET transistor 57 to a capacitor 59 and to the control electrode of a MOS transistor 61. At the other end the capacitor 59 is connected to the O line of the supply. The control electrode (gate) of the FET transistor 57 is connected through a resistor 63 to the collector of a pnp-transistor 65. This collector is furthermore connected through a resistor 67 to the −12 Volt voltage supply. The emitter of transistor 65 is connected through a resistor 69 to the +12 Volt voltage supply and furthermore it receives a pulse originating from an output 71 of the pulse generator 9, which pulse is shown in FIG. 2*e*. This pulse occurs every time at the leading edge of the synchronizing pulse in the video signal and always precedes the pulse of FIG. 2*d*.

The transistors 57, 61 and 65 and the capacitor 59 form part of the read-out storage circuit 23. An output electrode of transistor 61 is connected through a resistor 73 to the −12 Volt voltage supply and is furthermore connected to an input 75 of the level variation circuit 25 which is connected to an input of a differential amplifier 77 another input of which is connected between O and −12 Volt to an adjustable potential divider 81, 83 bypassed by a capacitor 79.

The signal applied to the input 75 of the level variation circuit 25, is shown in FIG. 2*g*. Dependent on the signal contents of the previous line scan period, a level value is obtained which, combined with a value determined by the potential divider circuit 81, 83 is applied to an output 85 of the differential amplifier 77 and further to the emitter of a pnp-transistor 87 serving as a clamping switch whose base receives a clamping pulse originating from an output 89 of the pulse generator 9 and occurring during the back poarch of the synchronizing pulse in the video signal. The collector of transistor 87 is connected to a capacitor 89 and to an input 91 of the level comparison circuit 27. At the other end the capacitor 98 is connected to a video signal input 93 of the level variation circuit which is connected to the output 13 of the video signal handling circuit 3. As a result of the clamping switch 87, the black level in the video signal at the input 91 of the level comparison circuit 27 is clamped every time at a level which depends on the picture contents of the video signal which occurred during the previous line period, which level occurs at the emitter of the clamping switch 87. This is shown in FIG. 2*h* in which a horizontal broken line shows the level above which the level comparison circuit 27 has an output voltage. The output voltage of the level comparison circuit 27 which may be, for example, a limiting differential voltage amplifier or a Schmitt trigger is shown in FIG. 2*i*. This waveform contains the information regarding the contours in the picture which are important for the determination of the surface of the relevant portion of the picture picked up.

This surface determination is furthermore performed by a surface determining circuit 93 which is operated by a programming circuit 95. The programming circuit 95 is controlled by the pulse generator 9.

Furthermore, FIG. 1 shows a picture display apparatus 97, in which optionally the video signal may be converted into a picture.

The operation of the video contour determining circuit will now be further described with reference to FIGS. 1 and 2.

The video signal of FIG. 2*c* at the input 17 is converted into a charge current of the capacitor 39 through the emitter follower 31 and the transistor 35 which serves as a current source. This capacitor 39 is first discharged as a result of the pulses of FIG. 2*d* after the voltage at the buffer storage capacitor 39 is transferred as a result of the pulses of FIG. 2*e* to the read-out storage capacitor 59. This voltage transfer is effected during the periods $t_1 - t_2$ and $t_{11} - t_{12}$ during which the FET transistor 57 conducts as a result of the positive pulses supplied by transistor 65 which is controlled by the pulses of FIG. 2*e*. The subsequent discharge of the buffer storage capacitor 39 is effected during the periods $t_3 - t_4$ and $t_{13} - t_{14}$ during which the FET transistor 45 conducts as a result of the positive pulses provided by transistor 49 which is controlled by the pulses of FIG. 2*d*. During the rest of the period transistors 45 and 57 are cut off.

The current dependent on the amplitude of the video signal and applied by transistor 35 to the buffer storage capacitor 39 during the periods $t_5 - t_8$ and $t_{15} - t_{18}$ causes the voltage across this capacitor to vary as is shown in FIG. 2*f* to a final value reached at the instants $t_8$ and $t_{18}$. The transistor 35 only conducts during the periods $t_5 - t_8$ and $t_{15} - t_{18}$ and is thus further cut off.

The voltage at the read-out storage capacitor 59 always corresponds to the voltage reached during the previous line period at the buffer storage capacitor 39, and is applied through transistor 61 to the input 75 of the differential amplifier 77.

The voltage level obtained is transferred through the differential amplifier 77 in the opposite sense and combined by the adjusting voltage of the potential divider 81, 83 to the clamping switch 87 which conducts during the periods $t_3 - t_4$ and $t_{13}$ and $t_{14}$ and as is illustrated in FIG. 2*h*, the level of the video signal at the input 91 of the level comparison circuit is adapted every time to the picture contents of the video signal of the previous line period, so that a rapid correction of this level is obtained and the influence of disturbing picture elements is immediately corrected.

In the description above the buffer storage capacitor 39 and transistor 35 constitute an integrator. Although this is a favorable combination, it is alternatively possible to store a maximum or minimum or a mean value located between the maximum or minimum values in the buffer storage capacitor, when instead of the integrator one or more detection circuits are used in the buffer storage circuit 19.

Instead of adapting the level of the video signal every time, it is of course alternatively possible to adapt the comparison level of the level comparison circuit 27, which was held constantly at the value shown by a broken line by FIG. 2*h*, and to apply the video signal at a constant level to the level comparison circuit 27.

The suppression of the video signal beyond the line flyback periods may be optionally omitted.

A level may of course alternatively be determined every two or more lines likewise as a mean level may be determined every two or more lines.

Because analog signals are employed capacitors are used as storage elements, but if for one reason or other the use of digital signals might be desired, different types of stores may optionally be used.

For the transistors and voltage supplies used, there applies that they only serve as Examples and they are not essential for the invention.

Although the contour determining circuit is used in a cardio-planimeter in this case, other uses such as, for example, in isodensity line scanners in which a correction of the isodensity level is desired may alternatively be possible.

What is claimed is:

1. A circuit for obtaining contour information during at least a line scan period from a video signal having a black level, said circuit comprising buffer storage means having an input coupled to receive said video signal and an output means for supplying an output signal having a value that is a function of the video amplitude levels of at least one previous line scan, a reset means coupled to said buffer storage means for resetting the output signal of said buffer means to a selected value after at least one line scan period, a readout storage means having an input coupled to said buffer means output for storing a constant amplitude signal having an amplitude that is a function of said output signal and an output means for supplying said constant amplitude signal, a level comparison means having a threshold level and having an input coupled to receive said video signal and an output means for supplying a signal whenever said video signal exceeds said threshold level, and a level variation circuit having an input coupled to said readout means output to receive said constant amplitude signal and an output means coupled to said comparison means for changing one of said black and threshold levels in accordance with said constant amplitude signal.

2. A circuit as claimed in claim 1 further comprising means coupled to said readout and reset means for generating control pulses synchronized with the video synchronizing pulses.

3. A circuit as claimed in claim 2 wherein said buffer means comprises a current source coupled to receive said video signal, and a first capacitor coupled to said current source; said reset means comprises a first switching means shunt coupled to said first capacitor; and said readout means comprises a second capacitor and a second switching means coupled between said capacitors, each of said switching means having a control input coupled to said generating means.

4. A circuit as claimed in claim 1 wherein said buffer means comprises an integrator.

5. A circuit as claimed in claim 1 wherein said level variation means comprises a clamping switch means for changing said black level.

* * * * *